United States Patent
Mizuno et al.

(10) Patent No.: US 10,166,868 B2
(45) Date of Patent: Jan. 1, 2019

(54) VEHICLE-MOUNTED EQUIPMENT OPERATION SUPPORT SYSTEM

(71) Applicant: Yazaki Corporation, Tokyo (JP)

(72) Inventors: Yoshiyuki Mizuno, Shizuoka (JP); Hisataka Kato, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/713,851

(22) Filed: Sep. 25, 2017

(65) Prior Publication Data

US 2018/0086206 A1 Mar. 29, 2018

(30) Foreign Application Priority Data

Sep. 28, 2016 (JP) ................................. 2016-190113

(51) Int. Cl.
*B60K 35/00* (2006.01)
*B60Q 1/00* (2006.01)

(52) U.S. Cl.
CPC ............ *B60K 35/00* (2013.01); *B60Q 1/0082* (2013.01); *B60K 2350/1024* (2013.01); *B60K 2350/1036* (2013.01); *B60K 2350/928* (2013.01)

(58) Field of Classification Search
CPC .............. B60K 35/00; B60K 2350/928; B60K 2350/1024
See application file for complete search history.

(56) References Cited

U.S. PATENT DOCUMENTS

| 8,446,265 B2 * | 5/2013 | Golomb | B60Q 1/0082 340/425.5 |
| 8,855,884 B1 * | 10/2014 | Fujitsuka | B60R 21/015 180/271 |

(Continued)

FOREIGN PATENT DOCUMENTS

| EP | 2 537 700 A1 | 12/2012 |
| JP | 2012-177999 A | 9/2012 |

(Continued)

OTHER PUBLICATIONS

Communication dated Oct. 30, 2018 issued by the Japanese Patent Office in counterpart application No. 2016-190113.

*Primary Examiner* — Nader Bolourchi
(74) *Attorney, Agent, or Firm* — Sughrue Mion, PLLC

(57) ABSTRACT

A vehicle-mounted equipment operation support system include: a vehicle-mounted equipment operating device including a contact operating surface allowing an operator to perform a contact operation with a finger when operating or stopping a vehicle-mounted equipment, and an operation mode detector detecting an operation mode of the operator with respect to an operation unit, and in which the contact operating surface is arranged at a position closer to a vehicle front side than a steering wheel and enables an operation of the operator without taking off a hand from the steering wheel and a plurality of contact operation modes are assigned to the contact operating surface; a display device capable of displaying operation-related information relating to the operation of the operator; and a controller capable of performing display control of the operation-related information on the display device based on an output signal of the operation mode detector.

13 Claims, 14 Drawing Sheets

(56) References Cited

U.S. PATENT DOCUMENTS

| | | | |
|---|---|---|---|
| 2007/0057781 A1* | 3/2007 | Breed | B60K 35/00 340/457.1 |
| 2012/0120006 A1* | 5/2012 | Liu | G06F 3/044 345/173 |
| 2012/0221199 A1 | 8/2012 | Saito | |
| 2012/0249473 A1* | 10/2012 | Suzuki | B60K 37/06 345/174 |
| 2014/0375584 A1* | 12/2014 | Kaiser | B60Q 1/1476 345/173 |
| 2015/0324006 A1* | 11/2015 | Mizuno | B60R 16/02 345/156 |
| 2015/0331494 A1* | 11/2015 | Mizuno | B60K 35/00 340/5.51 |
| 2016/0347177 A1 | 12/2016 | Mochizuki et al. | |
| 2017/0108946 A1 | 4/2017 | Nishida | |

FOREIGN PATENT DOCUMENTS

| | | |
|---|---|---|
| JP | 2014-144693 A | 8/2014 |
| JP | 2015-228118 A | 12/2015 |
| JP | 2016-168960 A | 9/2016 |
| WO | 2015/141087 A1 | 9/2015 |

\* cited by examiner

FIG.8
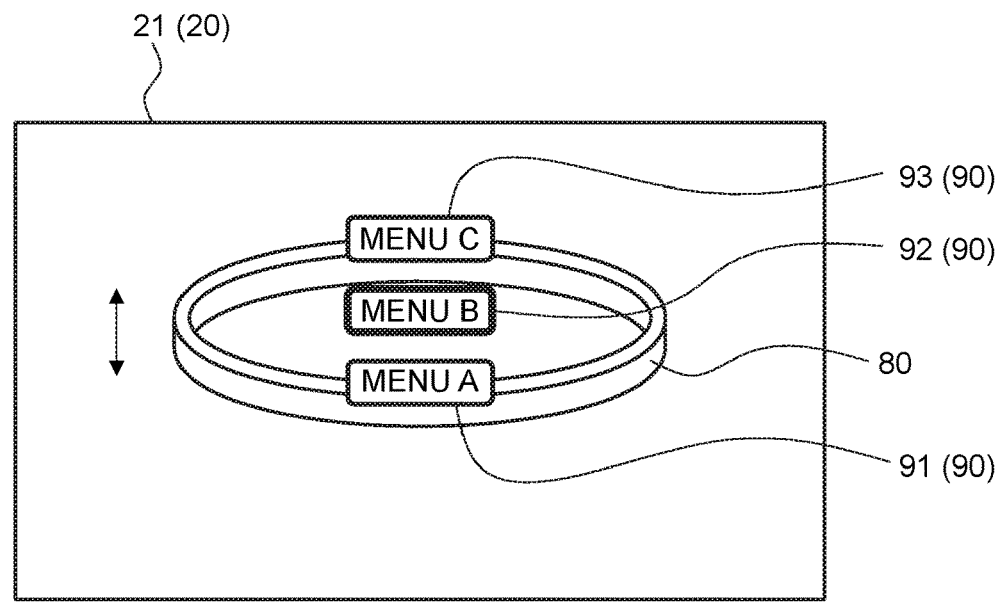
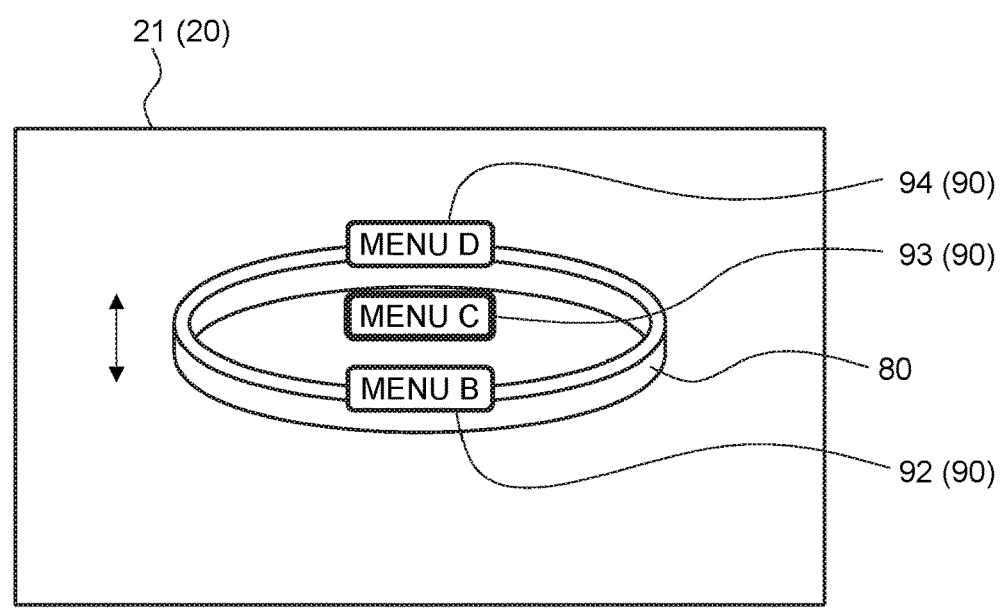

US 10,166,868 B2

VEHICLE-MOUNTED EQUIPMENT OPERATION SUPPORT SYSTEM

CROSS-REFERENCE TO RELATED APPLICATION(S)

The present application claims priority to and incorporates by reference the entire contents of Japanese Patent Application No. 2016-190113 filed in Japan on Sep. 28, 2016.

BACKGROUND OF THE INVENTION

1. Field of the Invention

The present invention relates to a vehicle-mounted equipment operation support system.

2. Description of the Related Art

Conventionally, vehicle-mounted equipment operation support systems, which support an operation of an operator by displaying information relating to the operation (hereinafter, referred to as "operation-related information") on a display device at the time of controlling various types of equipment mounted on a vehicle (hereinafter, referred to as "vehicle-mounted equipment") in response to the operation on an operation device (hereinafter, referred to as "vehicle-mounted equipment operating device") performed by the operator, have been known. For example, the following Japanese Patent Application Laid-open No. 2012-177999 discloses a technique of changing display content of a display device in accordance with content of an operation of an operator. In addition, the following Japanese Patent Application Laid-open No. 2015-228118 discloses a vehicle-mounted equipment operating device in which an upper surface and a side peripheral surface of a truncated cone are used as touch operating surfaces, as a device that is used for an operation.

Meanwhile, when an operator operates a vehicle-mounted equipment operating device with a finger, the operator generally operates the vehicle-mounted equipment operating device in an operation mode according to a control mode of vehicle-mounted equipment that the operator desires after visually recognizing the operation mode assigned to the vehicle-mounted equipment operating device each time of the operation or in advance. However, when the vehicle-mounted equipment operating device is arranged at a place that is hardly visually recognized, it is difficult to associate the operation mode assigned to the vehicle-mounted equipment operating device and the operation mode desired by the operator with the operator. Thus, there is room for improvement in the conventional vehicle-mounted equipment operation support system in terms of improving operability with respect to the vehicle-mounted equipment operating device.

SUMMARY OF THE INVENTION

Thus, an object of the present invention is to provide a vehicle-mounted equipment operation support system that is capable of improving operability.

In order to achieve the above mentioned object, a vehicle-mounted equipment operation support system according to one aspect of the present invention includes a vehicle-mounted equipment operating device that includes a contact operating surface, prepared at least as an operation unit when an operator operates or stops a vehicle-mounted equipment mounted on a vehicle to allow the operator to perform a contact operation with a finger when operating or stopping the vehicle-mounted equipment, and an operation mode detector to detect an operation mode of the operator with respect to the operation unit, the contact operating surface being arranged at a position that is closer to a vehicle front side than a steering wheel and that enables an operation of the operator without taking off a hand from the steering wheel, and a plurality of contact operation modes being assigned to the contact operating surface; a display device capable of displaying operation-related information relating to the operation of the operator with respect to the operation unit; and a controller configured to be capable of performing display control of the operation-related information on the display device based on an output signal of the operation mode detector, and shifting display content of the operation-related information according to the output signal.

According to another aspect of the present invention, in the vehicle-mounted equipment operation support system, it is desirable that the controller causes the display device to display as the operation-related information at least one of: (a) operation assistance information indicating assignment of the contact operation mode with respect to the contact operating surface in association with an operation command for the vehicle-mounted equipment; (b) operation information indicating an operation mode when the operator operates the contact operating surface; (c) operation result information indicating an operation result when the operator operates the contact operating surface; and (d) equipment information indicating a state of the vehicle-mounted equipment.

According to still another aspect of the present invention, in the vehicle-mounted equipment operation support system, it is desirable that the vehicle-mounted equipment operating device includes a touch sensor including the contact operating surface and the operation mode detector.

According to still another aspect of the present invention, in the vehicle-mounted equipment operation support system, it is desirable that the display device is a head-up display device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a view illustrating an example of display content to be displayed on a display device and represents states before and after shift of the display content;

DETAILED DESCRIPTION OF THE PREFERRED EMBODIMENTS

Hereinafter, an embodiment of a vehicle-mounted equipment operation support system according to the present invention will be described in detail with reference to the drawings. Incidentally, the present invention is not limited by the present embodiment.

Embodiment

One of embodiments of the vehicle-mounted equipment operation support system according to the present invention will be described with reference to FIGS. 1 to 8.

Figure 1:
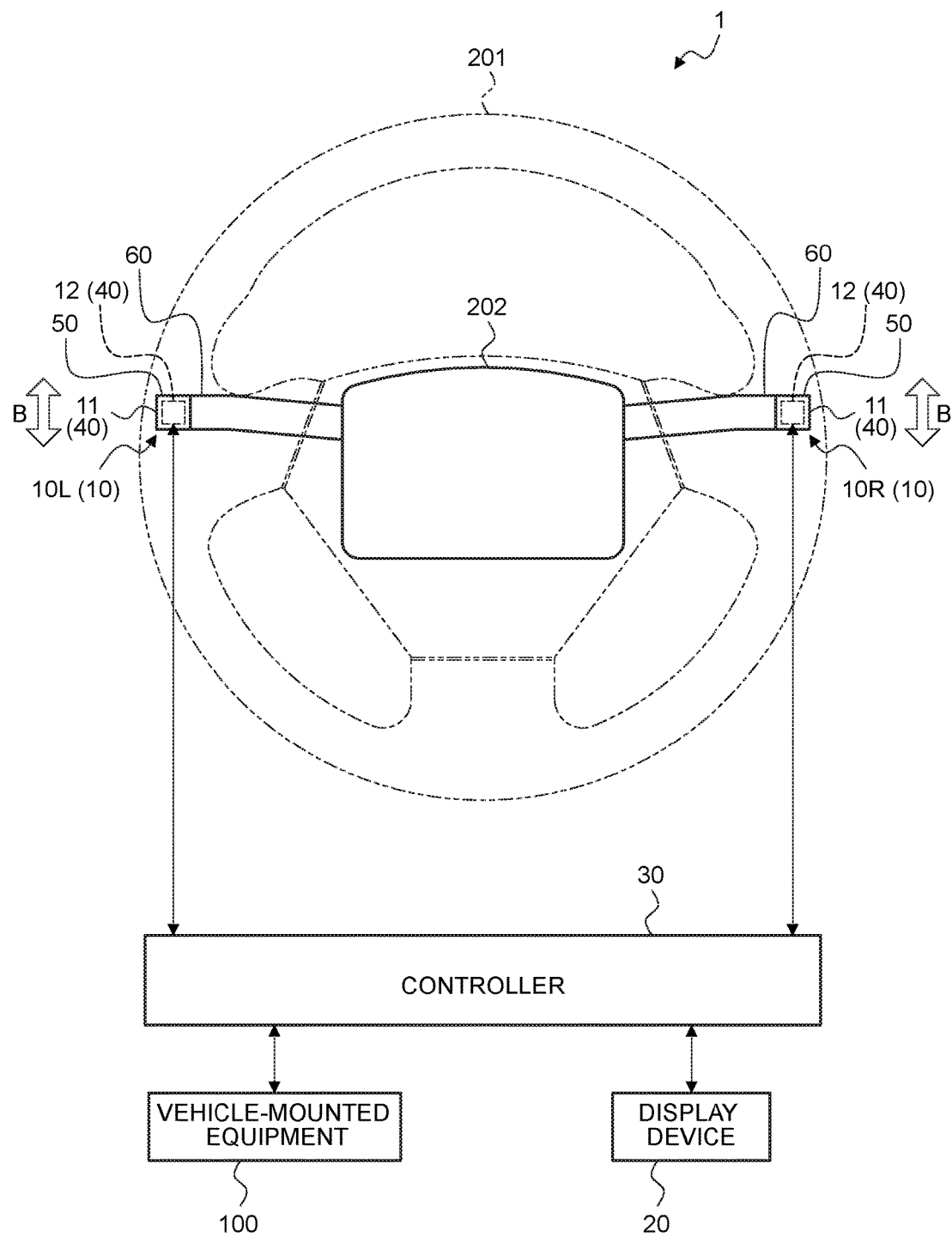
FIG. 1 is a front view illustrating a vehicle-mounted equipment operation support system according to an embodiment.
Figure 2:
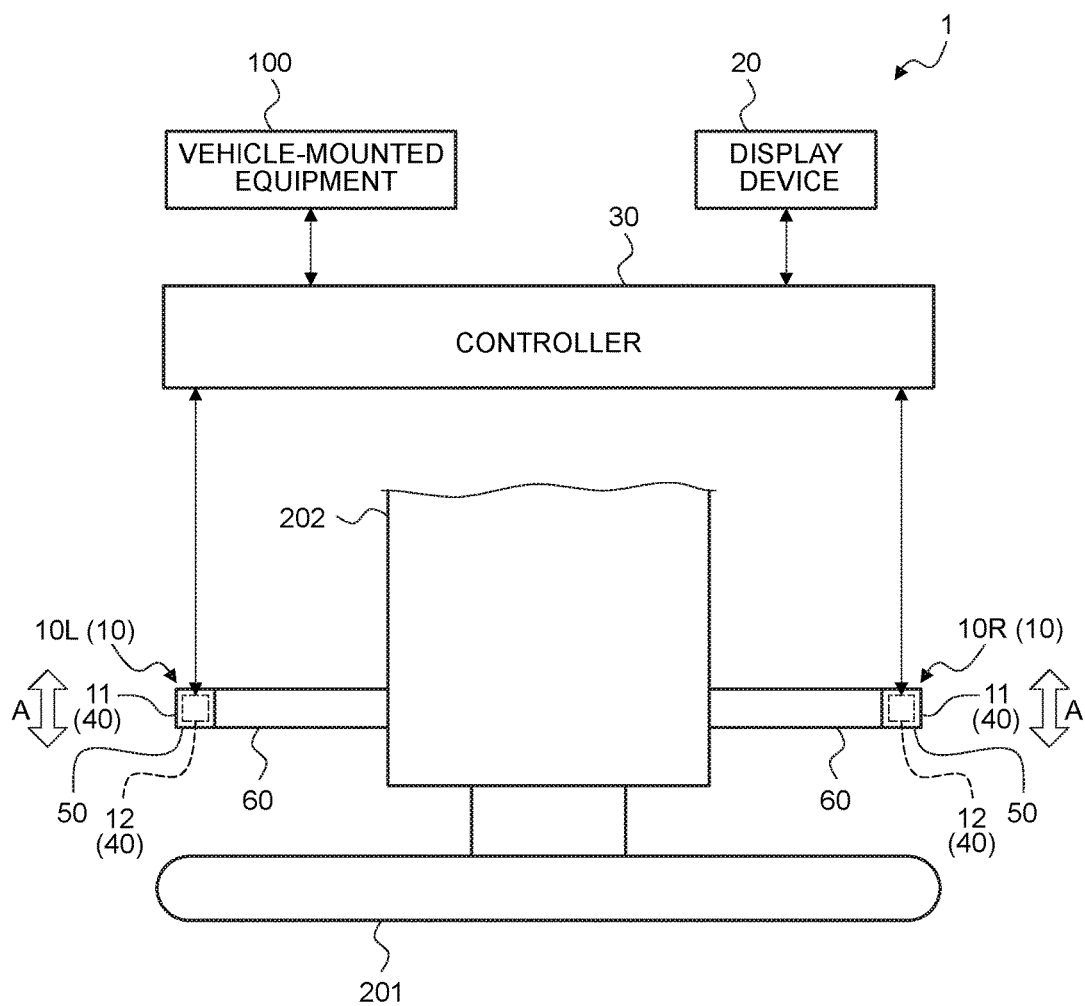
FIG. 2 is a top view illustrating the vehicle-mounted equipment operation support system according to the embodiment.
Figure 3:
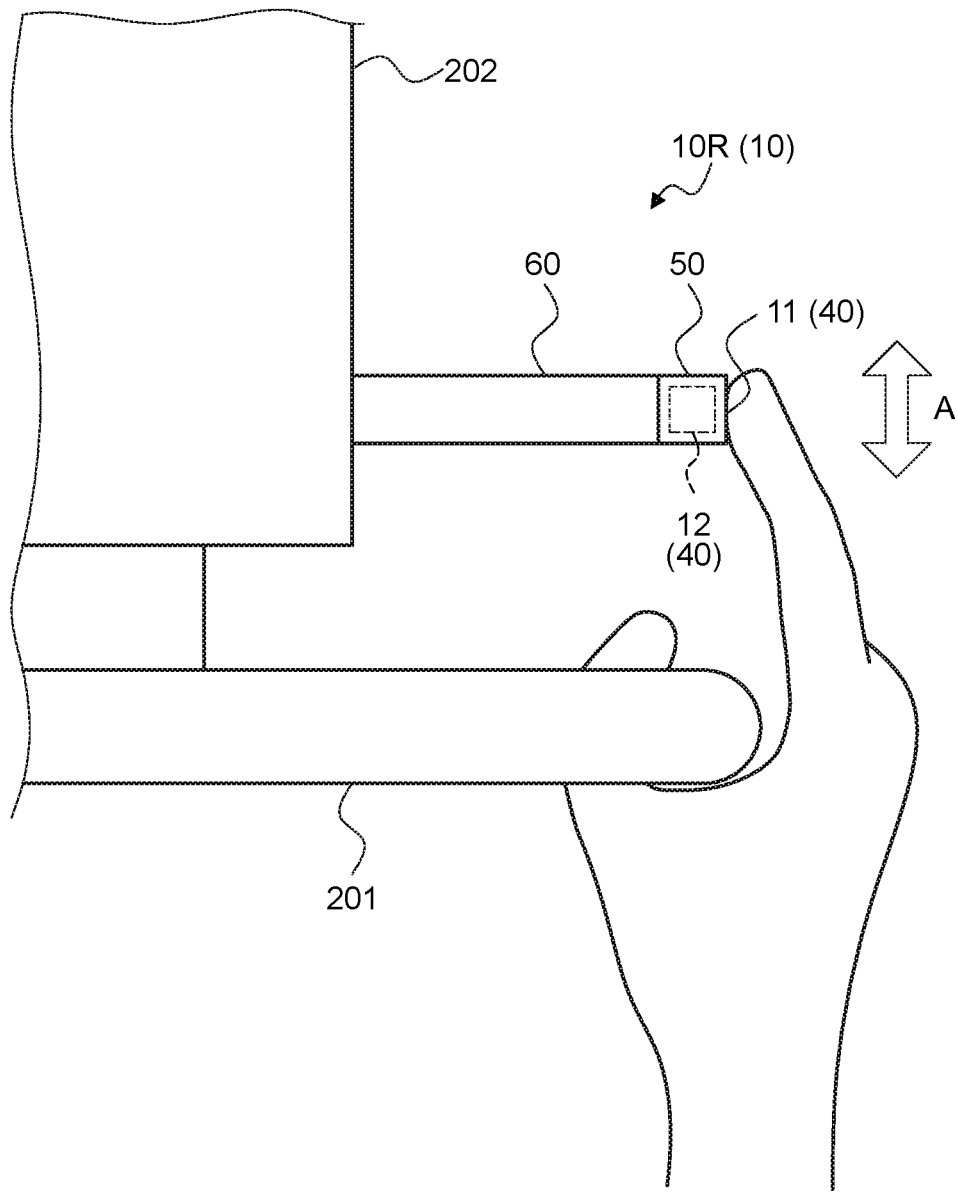
FIG. 3 is a view illustrating an example of a slide operation.

Reference sign 1 in FIGS. 1 and 2 represents the vehicle-mounted equipment operation support system according to the present embodiment. The vehicle-mounted equipment operation support system 1 is configured to support an operator's operation on vehicle-mounted equipment 100 when the operator performs the operation with respect to the equipment (vehicle-mounted equipment) 100 mounted on a vehicle by presenting information (operation-related information) relating to the operation in at least a visible manner. The vehicle-mounted equipment operation support system 1 is provided with: an operation device (vehicle-mounted equipment operating device) 10 which includes an operation unit configured to operate the vehicle-mounted equipment 100; a display device 20 which is capable of displaying the operation-related information; and a controller 30 which is capable of performing display control of the operation-related information onto the display device 20.

Here, the vehicle-mounted equipment 100 refers to equipment that is mounted at any place in the vehicle regardless of whether the equipment is inside or outside a passenger compartment, and has at least one function of operating according to the operation of the operator on the operation unit of the vehicle-mounted equipment operating device 10. The vehicle-mounted equipment 100 operates or stops the function (including a change of an operation state) in accordance with an operation command accompanying the operation of the operator. For example, the vehicle-mounted equipment 100 inside the passenger compartment includes acoustic equipment such as audios and radios, an air conditioning machine (so-called air conditioner), a car navigation system, and the like. In addition, the vehicle-mounted equipment 100 inside the passenger compartment also includes equipment that is not attached to the vehicle in advance but is mounted on the vehicle as being carried inside the vehicle compartment (for example, communication equipment such as a mobile phone, a portable music player, and the like). On the other hand, the vehicle-mounted equipment 100 outside the vehicle compartment includes vehicle lighting equipment (a headlamp, a taillight, and the like), a direction indicator, a wiper, and the like. The controller 30 may be one that can control the operation and stop of the vehicle-mounted equipment 100.

The operation-related information is information that relates to the operation on the operation unit of the vehicle-mounted equipment operating device 10 performed by the operator. It is possible to consider information that serves as assistance when the operator operates the operation unit of the vehicle-mounted equipment operating device 10 (hereinafter, referred to as "operation assistance information"), information indicating a operation mode when the operator operates the operation unit of the vehicle-mounted equipment operating device 10 (hereinafter, referred to as "operation information"), information indicating an operation result when the operator operates the operation unit of the vehicle-mounted equipment operating device 10 (hereinafter, referred to as "operation result information"), and information indicating a state of the vehicle-mounted equipment 100 (hereinafter, referred to as "equipment information"), and the like, as the operation-related information. For example, the controller 30 causes at least one of the operation assistance information, the operation information, the operation result information, and the equipment information to be displayed on the display device 20 as the operation-related information.

To be specific, the operation assistance information is information indicating assignment of the operation mode with respect to the vehicle-mounted equipment operating device 10 (for example, a contact operation mode with respect to a contact operating surface 11 to be described later) in association with an operation command with respect to the vehicle-mounted equipment 100. For example, when the vehicle-mounted equipment 100 is the acoustic equipment, the operation assistance information is obtained by associating the contact operation mode in a certain direction with the contact operating surface 11 and an operation command for volume-up, and assists the contact operation with respect to the contact operating surface 11 performed by the operator who wishes to raise the volume. In this illustrated example, a virtual operation unit FIG. 80, which will be described later, and a selection icon 90 are used as the operation assistance information.

It is possible to consider information visually indicating movement associated with a contact operation direction when the operator performs the contact operation in a certain direction with respect to the contact operating surface 11 in the case of exemplifying the preceding acoustic equipment, for example, as the operation information. In this illustrated example, the movement of the selection icon 90 remaining in a display state to be described later is used as the operation information.

It is possible to consider information indicating an increased volume that has been changed along with a contact operation when the operator performs the contact operation in a certain direction with respect to the contact operating surface 11 in the case of exemplifying the preceding acoustic equipment, for example, as the operation result information. In this illustrated example, a second selection icon 92, displayed in a highlighted manner as will be described later, is used as the operation result information.

The equipment information may include not only information on an operation state or a stop state of the vehicle-mounted equipment 100 when the operation unit of the vehicle-mounted equipment operating device 10 is operated but also information on an operation state or a stop state of the vehicle-mounted equipment 100 when the operation unit is not operated. It is possible to consider the information indicating the increased volume as the preceding operation result information, information obtained by highlighting this information, and the like, in the case of exemplifying the preceding acoustic equipment, for example, as the equipment information. In this illustrated example, content of the second selection icon 92, displayed in a highlighted manner as will be described later, is used depending on the content as the equipment information.

Incidentally, the operation-related information may be not only information that stimulates a visual sense of the operator as above but also information that stimulates an auditory sense of the operator such as a sound and voice.

The vehicle-mounted equipment operating device 10 is arranged at a position that is closer to a vehicle front side (that is, a back side of a steering wheel 201) than the steering wheel 201 and enables the operator to perform the operation thereof without taking off a hand from the steering wheel 201. For example, the vehicle-mounted equipment operating device 10 is arranged on at least one of a left side (vehicle left side) and a right side (vehicle right side) in a vehicle width direction when viewed from a center portion of the steering wheel 201. In the illustrated examples of FIGS. 1 and 2, the same vehicle-mounted equipment operating devices 10 are provided on the vehicle left side and the vehicle right side, one by one (vehicle-mounted equipment operating devices 10L and 10R). Each of the vehicle-mounted equipment operating devices 10L and 10R is configured to be symmetric right and left as viewed from the center portion of the steering wheel 201. Thus, the vehicle-mounted equipment operating device 10 will be described hereinafter by exemplifying the vehicle-mounted equipment operating device 10R on the vehicle right side as a representative as necessary.

The vehicle-mounted equipment operating device 10 is provided with the contact operating surface 11 which serves as the operation unit through which the operator performs the contact operation with the finger at the time of operating or stopping the vehicle-mounted equipment 100, and an operation mode detector 12 which detects the operation mode of the operator with respect to the operation unit. Here, the contact operating surface 11 is prepared at least as the operation unit used when the operator operates or stops the vehicle-mounted equipment 100. Thus, the vehicle-mounted equipment operating device 10 may be provided with an operation unit different from the contact operating surface 11.

A plurality of contact operation modes are assigned to the contact operating surface 11. A slide operation of tracing the contact operating surface 11 with a fingertip (for example, a direction of an arrow A in FIGS. 2 and 3 and a direction of an arrow B in FIG. 1) and a touch operation of touching the contact operating surface 11 with the fingertip (for example, a direction of an arrow C in FIG. 4) are assigned, as the contact operation modes, on the contact operating surface 11 illustrated in this example.

For example, it is possible to assign a selection operation function (that is, information on the operation of the vehicle-mounted equipment 100), such as a device selection operation for selection of desired equipment from among a plurality of vehicle-mounted equipment 100, a function selection operation for selection of a desired function from among a plurality of functions of the vehicle-mounted equipment 100, and a condition selection operation for selection of a desired selection condition from among a plurality of selection conditions of a certain function, as the slide operation. The device selection operation and the function selection operation can be referred to as a so-called menu selection operation. The function selection operation is an operation of selecting a desired function from among a media selection function, a volume selection function, a track selection function, and the like, for example, when the vehicle-mounted equipment 100 is the acoustic equipment. The condition selection operation is an operation of selecting a desired volume, for example, when the volume selection function is selected.

Figure 4:
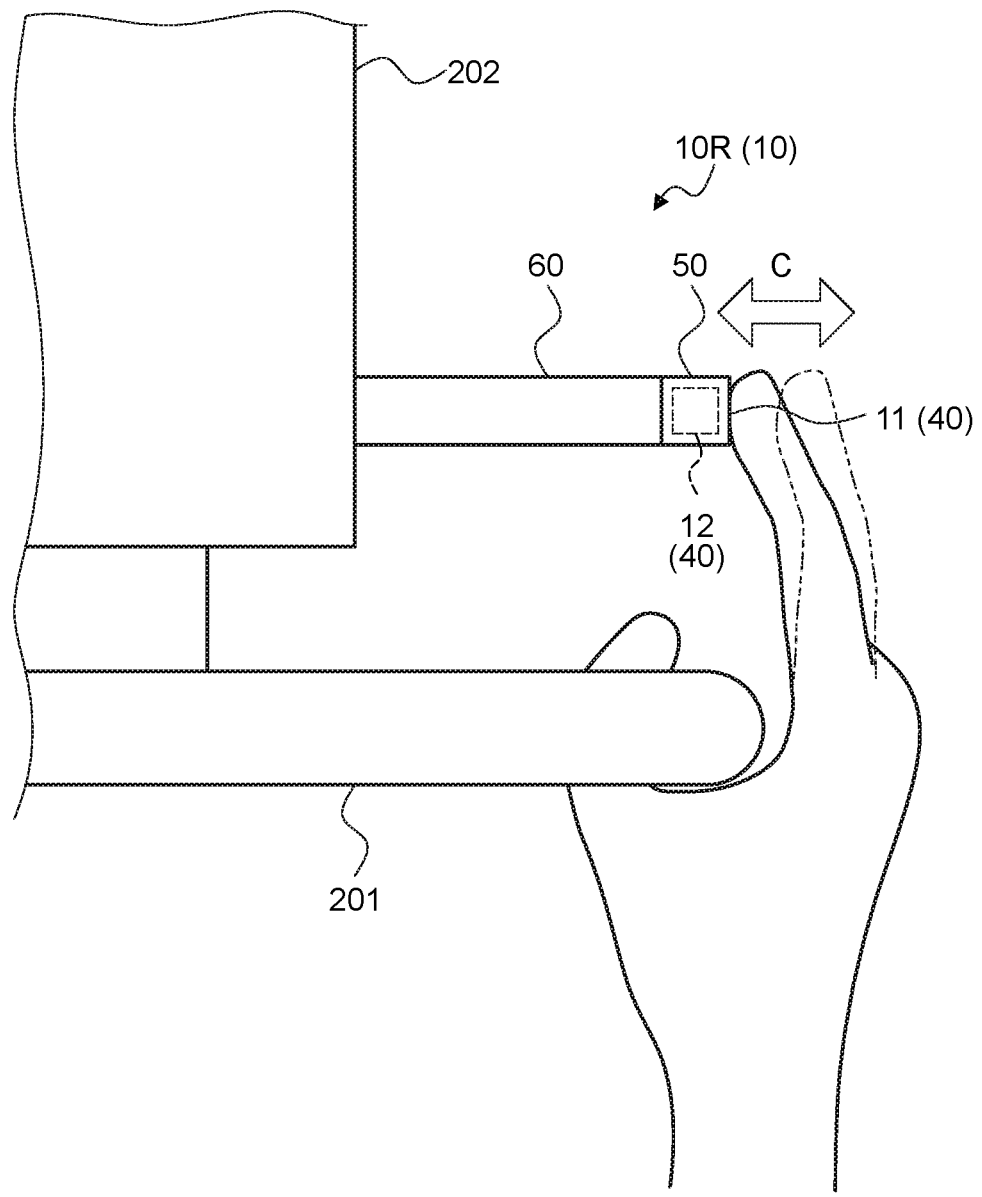
FIG. 4 is a view illustrating an example of a touch operation.

The touch operation is an operation of touching the contact operating surface 11 with a finger by reciprocating the finger in the direction of the arrow C in FIG. 4. For example, it is possible to assign a decision operation function performed at the time of deciding a function or a selection condition selected by the slide operation in accordance with the contact time, a return operation function to instantly return to a selection operation of a previous level or a selection operation of a first layer, and the like, as the touch operation. It is possible to set a single touch operation or a plurality of times of repeated hitting operations as the touch operation.

The vehicle-mounted equipment operating device 10 is provided with at least the one contact operating surface 11 configured in this manner. The contact operating surface 11 is arranged at a position that is closer to the vehicle front side than the steering wheel 201 and enables the operator to perform the operation thereof without taking off the hand from the steering wheel 201. The position is a place where the operator can reach the fingertip of the finger (for example, the middle finger or the index finger) while holding the steering wheel 201. This position may be any place as long as the position is in the vicinity of a rim of the steering wheel 201, but it is desirable to provide this position in the vicinity of a position at which the steering wheel 201 is held by a general operator. Thus, in this illustrated example, the contact operating surface 11 is arranged at a position spaced apart from a left end portion of the steering wheel 201 in the vehicle width direction within a range where a fingertip of a left hand reaches a vehicle front side in the case of the vehicle-mounted equipment operating device 10L on the vehicle left side. In the same manner, the contact operating surface 11 is arranged at a position spaced apart from a right end portion of the steering wheel 201 in the vehicle width direction within a range where a fingertip of a right hand reaches a vehicle front side in the case of the vehicle-mounted equipment operating device 10R on the vehicle right side.

Here, it is desirable to provide a surface-textured portion (not illustrated) obtained by performing surface texturing on the entire surface or a part of the contact operating surface 11. In this illustrated example, the surface-textured portion is provided on the entire surface of the contact operating surface 11. The surface-textured portion is configured to improve slip of the fingertip at the time of performing the slide operation by reducing a frictional resistance. Thus, it is possible to improve the operability at the time of performing the slide operation when the surface-textured portion is provided on the contact operating surface 11. In addition, the vehicle-mounted equipment operating device 10 can not only obtain an effect of improving the operability accompanying implementation of a smooth contact operation of the operator on the contact operating surface 11 but also suppress the occurrence of the erroneous operation accompanying the smooth contact operation using the above-described surface-textured portion. Accordingly, the vehicle-mounted equipment operating device 10 can further suppress the occurrence of erroneous detection of the contact operation mode accompanying the erroneous operation while further improving the operability with respect to the contact operating surface 11.

It is enough if the operation mode detector 12 can detect at least the contact operation mode of the operator with respect to the contact operating surface 11. For example, the operation mode detector 12 detects a slide operation direction and a slide amount when the slide operation is performed with respect to the contact operating surface 11, and detects a touch operation together with the time for which the contact operating surface 11 is touched when the touch operation is performed with respect to the contact operating surface 11.

Figure 5:
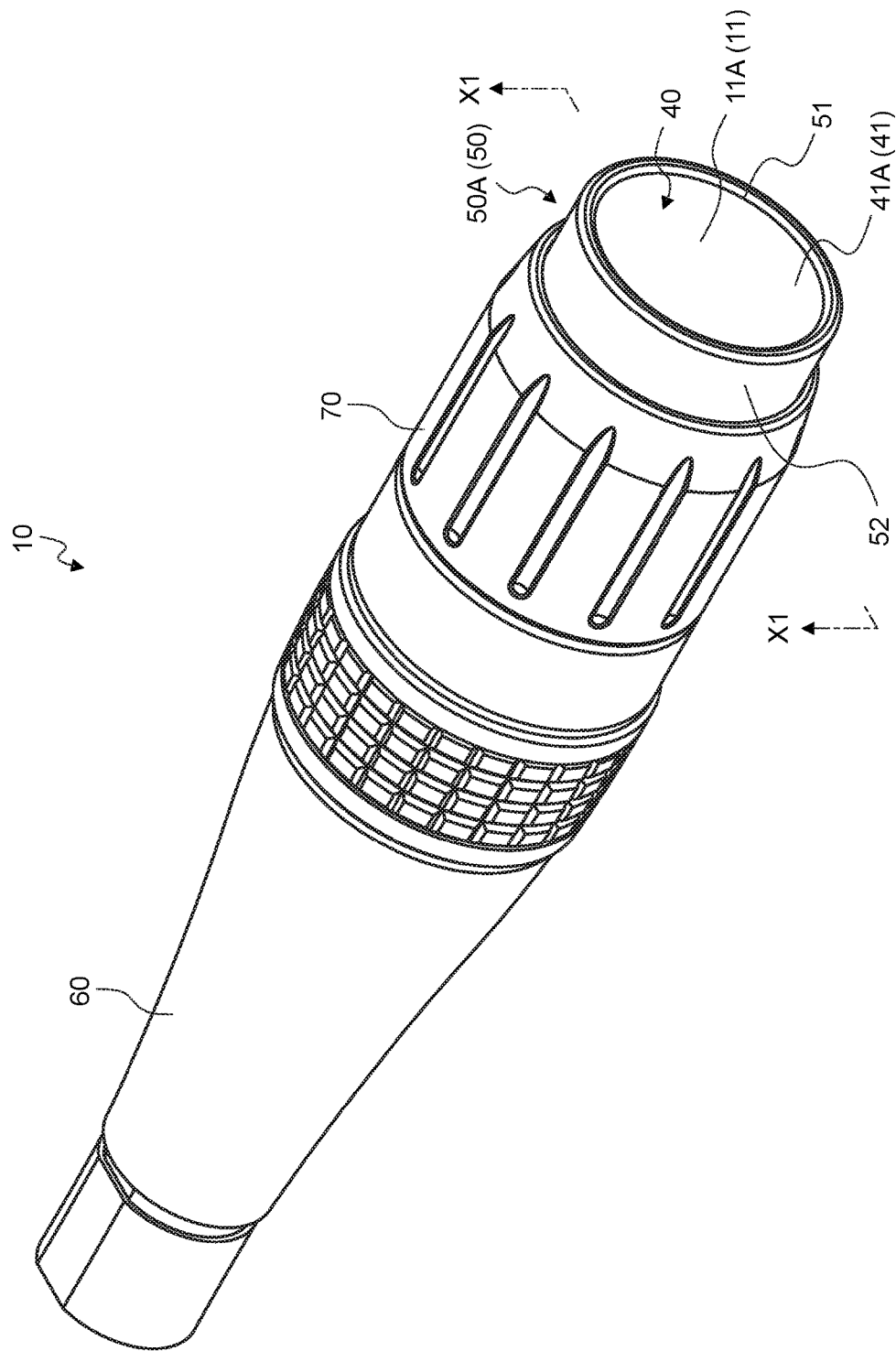
FIG. 5 is a perspective view illustrating a vehicle-mounted equipment operating device according to the embodiment.

To be specific, the vehicle-mounted equipment operating device 10 according to the present embodiment is provided with an operation input detector 40 through which an input operation performed by a contact operation of the operator is performed and which detects a contact operation mode accompanying the contact operation, and a housing member 50 which houses and holds the operation input detector 40 (FIGS. 1 to 5). The operation input detector 40 is provided with the contact operating surface 11 and the operation mode detector 12, and is arranged at a position that is closer to the vehicle front side than the steering wheel 201 and enables the operator to perform the operation thereof without taking off the hand from the steering wheel 201. In this illustrated example, the operation input detector 40 and the housing member 50 are arranged at such a position, and then, the both are held by any parts inside the passenger compartment. The vehicle-mounted equipment operating device 10 illustrated in this example is provided with a connection member 60 that connects the housing member 50 to a steering column 202, and the operation input detector 40 and the housing member 50 are held by the steering column 202 via the connection member 60. Further, the vehicle-mounted equipment operating device 10 illustrated in this example is also provided with a rotation operating member 70 as an operation unit different from the contact operating surface 11 (FIG. 5).

Figure 6:
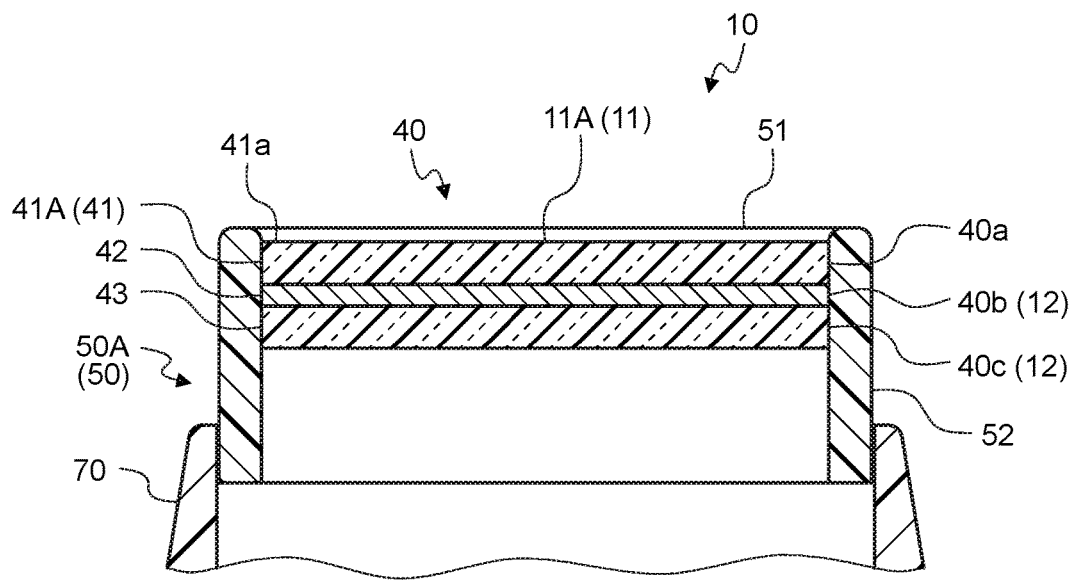
FIG. 6 is a cross-sectional view taken along line X1-X1 of FIG. 5.
Figure 7:
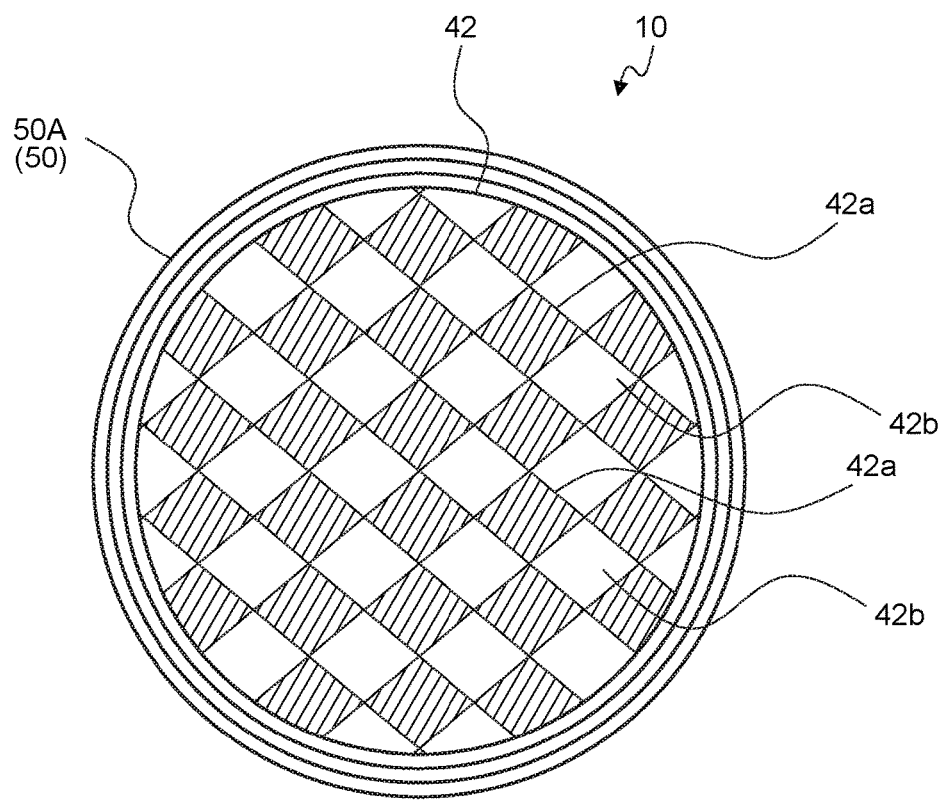
FIG. 7 is a schematic view illustrating a pattern electrode.

For example, the operation input detector 40 is configured as a touch sensor including the contact operating surface 11 and the operation mode detector 12. The operation input detector 40 illustrated in this example is configured as a capacitive touch sensor, and is housed in the housing member 50 as a laminate of an insulating layer 40a, a conductive layer 40b, and a substrate layer 40c (FIG. 6). The contact operating surface 11 is provided on the insulating layer 40a. On the other hand, the operation mode detector 12 is configured of the conductive layer 40b and the substrate layer 40c.

A mutual capacitance system can be used as the operation input detector 40. Thus, the operation input detector 40 is provided with an insulating contact operating member 41 including the contact operating surface 11 (FIGS. 5 and 6), and the insulating layer 40a is formed using the contact operating member 41 (FIG. 6). A contact operating member 41A, molded in a disk shape using an insulating material such as glass and synthetic resin, is provided in this illustrated example. One of the two circular flat surfaces is used as a contact operating surface 11A in the contact operating member 41A (FIGS. 5 and 6). The contact operating surface 11A illustrated in this example is formed to have a size that can be covered with the fingertip of the operator's finger. In addition, the operation input detector 40 is provided with a pattern electrode 42 in which a transmitting electrode 42a and a receiving electrode 42b are alternately arranged in a lattice pattern (FIG. 7), and the conductive layer 40b is formed using the pattern electrode 42 (FIG. 6). In addition, the operation input detector 40 is provided with a substrate 43 including an integrated circuit (not illustrated) for arithmetic processing, and the substrate layer 40c is formed using the substrate 43 (FIG. 6). The integrated circuit is electrically connected to the pattern electrode 42 and detects a change of an electric field between the transmitting electrode 42a and the receiving electrode 42b. The integrated circuit transmits a result of the detection (that is, the change of the electric field indicating the contact operation mode) to the controller 30 in a wired or wireless manner.

In this manner, an output signal according to the contact operation mode with respect to the contact operating surface 11A is output from the operation mode detector 12 and is input to the controller 30 in the operation input detector 40. The controller 30 detects the contact operation mode with respect to the contact operating surface 11A based on the output signal. For example, when detecting the slide operation and the slide operation direction thereof, the controller 30 executes control in response to the slide operation. Here, the controller 30 is set such that it is detected as the same operation even if there is deviation within a predetermined range with respect to a reference contact operation position, at a contact operation position of the slide operation on the contact operating surface 11A, and it is detected as the same operation even if there is an angle difference within a predetermined range with respect to a reference slide operation direction, in the slide operation direction of the slide operation on the contact operating surface 11A.

In this illustrated example, the slide operation in a plurality of directions (for example, a vehicle upper-lower direction and a vehicle front-rear direction) and the touch operation are assigned as the contact operation modes with respect to the contact operating surface 11A.

The vehicle-mounted equipment operating device 10 according to the present embodiment is provided with a peripheral wall portion 52 which is arranged so as to cover a peripheral edge portion of the contact operating surface 11A (that is, a peripheral edge portion 41a of the contact operating member 41A) to expose the contact operating surface 11A and enclose the operation mode detector 12. Further, the contact operating surface 11A is recessed to an inner side of the peripheral wall portion 52 such that the operator can perform the contact operation while touching an end portion of the peripheral wall portion 52 (an end portion on a side on which the contact operating surface 11A is exposed) with the finger. In this illustrated example, the peripheral wall portion 52 is provided in the housing member 50.

The housing member 50 includes the peripheral wall portion 52 forming an opening 51 (FIGS. 5 and 6). The housing member 50 is molded using an insulating material such as synthetic resin. A cylindrical housing member 50A having both ends opened in a cylinder axis direction is used in this illustrated example. One of two circular openings is used as the opening 51 in this housing member 50A. The housing member 50A exposes the contact operating surface 11A from the opening 51. The housing member 50A illustrated in this example holds the contact operating member 41A in a state where an axis line of the contact operating member 41A matches the cylinder axis so as to expose the contact operating surface 11A from the opening 51. For example, the housing member 50A houses and holds the contact operating member 41A by fitting the peripheral edge portion 41a of the contact operating member 41A to an inner peripheral wall thereof (FIG. 6). Accordingly, the housing member 50A exposes the contact operating surface 11A from the opening 51 while covering a peripheral edge portion of the contact operating surface 11A with the peripheral wall portion 52. Further, the contact operating member 41A and the housing member 50A may be integrated by performing integral molding such as two-color molding when the respective members are formed using different materials or colors, for example. In addition, the contact operating member 41A and the housing member 50A may be molded as a single cylindrical part whose one end is closed in the cylinder axis direction when the respective members are formed using the same material and the same color.

The operation mode detector 12 is housed and held at the inner side of the housing member 50A. The substrate 43 illustrated in this example is molded in a disk shape and arranged at the inner side of the housing member 50A more than the contact operating member 41A. The pattern electrode 42 is interposed between the contact operating member 41A and the substrate 43. In this manner, the housing member 50A includes the operation mode detector 12. For example, a holding portion to hold the pattern electrode 42 and the substrate 43 is formed at the inner side of the housing member 50A although not illustrated.

The connection member 60 is molded as a cylindrical elongated member using an insulating material such as synthetic resin, and one end in a longitudinal direction thereof is attached to the steering column 202. The connection member 60 is arranged in the state of protruding from the steering column 202 in a predetermined direction. The connection member 60 may be molded in a straight shape or provided with a bent portion in the middle of a path as long as extending between the steering column 202 and the operation input detector 40 and the housing member 50 (the housing member 50A). The predetermined direction is a direction from the steering column 202 toward the operation input detector 40 and the housing member 50. For example, the predetermined direction includes a radial direction, an upper right direction toward the vehicle right side and the vehicle upper side, a lower right direction toward the vehicle right side and the vehicle lower side, an upper left direction toward the vehicle left side and the vehicle upper side, a lower left direction toward the vehicle left side and the vehicle lower side, directions further inclined to the vehicle rear side with the end portion on the steering column 202 side as a fulcrum in these respective directions, and the like. The connection member 60 of the vehicle-mounted equipment operating device 10L is formed to have the other end (end portion in a projecting direction) extended to a position that enables the operator holding a left end portion or the vicinity of the left end portion of the steering wheel 201 in the vehicle width direction to touch the contact operating surface 11A with his own finger. In addition, the connection member 60 of the vehicle-mounted equipment operating device 10R is formed to have the other end (end portion in the projecting direction) extended to a position that enables the operator holding a right end portion or the vicinity of the right end portion of the steering wheel 201 in the vehicle width direction to touch the contact operating surface 11A with his own finger. The connection member 60 is attached after arranging the housing member 50 on the other end thereof.

The rotation operating member 70 is provided as the operation unit different from the contact operating surface 11. For example, the rotation operating member 70 is molded in a cylindrical shape using an insulating material such as synthetic resin and arranged concentrically so as to cover an outer peripheral wall of the connection member 60 with an inner peripheral wall thereof. The rotation operating member 70 can rotate about the cylinder axis in a relative manner with respect to the connection member 60, and the function of the vehicle-mounted equipment 100 is assigned to the rotation thereof.

The display device 20 displays at least the operation-related information. For example, it is possible to consider a device deployed as one configuration of an instrument device, a device deployed as a monitor of a car navigation system, a device deployed as a display unit of a head-up display device, as the display device 20. An area (hereinafter, referred to as "display area") 21 on which the operation-related information is displayed is provided in the display device 20 (FIG. 8). The entire display unit (portion where information and the like is displayed) in the display device 20, or a part of the display unit may be assigned in the display area 21. Display information in the display area 21 is controlled by the controller 30 such that display content thereof is changed.

As described above, the controller 30 performs display control of at least the operation-related information on the display device 20. For example, the controller 30 is capable of performing the display control of the operation-related information on the display device 20 based on the output signal of the operation mode detector 12, and shifts the display content of the operation-related information according to the output signal. One of specific examples thereof will be given hereinafter.

For example, when detecting the touch operation with respect to the contact operating surface 11 (the contact operating surface 11A), the controller 30 activates this system and displays an initial screen or a screen according to the contact operation mode on the display area 21. For example, the virtual figure (hereinafter, referred to as the "virtual operation unit figure") 80 schematically represented so as to enable the contact operating surface 11 to be analogized and the plurality of selection icons 90 relating to the above-described selection operation function are displayed in the display area 21 (FIG. 8) such that the operator can visually recognize the contact operating surface 11, arranged at a position that is hardly visually recognized, alternatively at another place. Although the display area 21 is represented as a rectangle herein, the display area 21 may be represented in another shape.

The virtual operation unit FIG. 80 is set to a figure that causes a circle to be recalled regardless of a true circle or an ellipse in order to cause estimation of the relevance to the circular contact operating surface 11. In this illustrated example, the virtual operation unit FIG. 80 represents an annular figure having an elliptical shape.

For example, a plurality of objects to be selected are arranged in association with the slide operation direction as the plurality of selection icons 90. Here, the selection icon 90 as the operation assistance information for selection of a menu is taken as an example. In this illustrated example, a vertical direction of the display area 21 is associated with the vehicle upper-lower direction, and the plurality of selection icons 90 are arranged side by side along the slide operation direction in the vehicle upper-lower direction.

In the display area 21 in the upper view of FIG. 8, a first selection icon 91, the second selection icon 92, and a third selection icon 93 are displayed, and "MENU B" indicated by the second selection icon 92 is highlighted as an icon that is being selected. The highlighted second selection icon 92 is not only the operation assistance information but also the operation result information. If the second selection icon 92 is the icon relating to a previous condition selection operation, the second selection icon 92 is not only the operation assistance information and the operation result information but also the equipment information.

For example, when the operator wishes to switch "MENU B" to "MENU C", the operator can recognize a desired operation direction of the slide operation by viewing the display area 21 in the upper view of FIG. 8 and perform the slide operation with respect to the contact operating surface 11 toward the vehicle lower side. When the output signal of the operation mode detector 12 in response to the slide operation is input, the controller 30 causes the display content of the operation-related information in the display area 21 to be shifted as illustrated in the lower view of FIG. 8. In the display area 21 in the lower view thereof, the second selection icon 92, the third selection icon 93, and a fourth selection icon 94 are displayed, the first selection icon 91 relating to "MENU A" disappears, and the fourth selection icon 94 relating to "MENU D" is newly displayed. In this display area 21, "MENU C" indicated by the third selection icon 93 is highlighted as an icon that is being selected.

When shifting the display content from the upper view to the lower view of FIG. 8, the controller 30 may perform the shift such that the display content is instantaneously switched or may perform the shift while displaying the selection icon 90 from a display position of the upper view of FIG. 8 to a display position of the lower view in conjunction with the slide operation on the contact operating surface 11. In the latter case, the movement of the selection icon 90 serves as the above-described operation information.

As described above, the vehicle-mounted equipment operation support system 1 according to the present embodiment is capable of assigning the plurality of contact operation modes in various forms to the single contact operating surface 11 and is configured to be highly convenient since it is possible to operate a large number of the vehicle-mounted equipment 100 or a large number of functions of the vehicle-mounted equipment 100 on the contact operating surface 11. On the contrary, when the contact operating surface 11 to which the plurality of contact operation modes are assigned is arranged particularly at a place that is hardly visually recognized, there is a possibility that it is difficult for the operator to recognize the vehicle-mounted equipment 100 and the functions of the vehicle-mounted equipment 100 associated with the respective contact operation modes. However, the vehicle-mounted equipment operation support system 1 displays the operation-related information associated with the contact operation mode to be visually recognizable and shifts the display content of the operation-related information according to the contact operation mode, and thus, is configured to give the favorable operability to the operator.

First Modification

Figure 9:
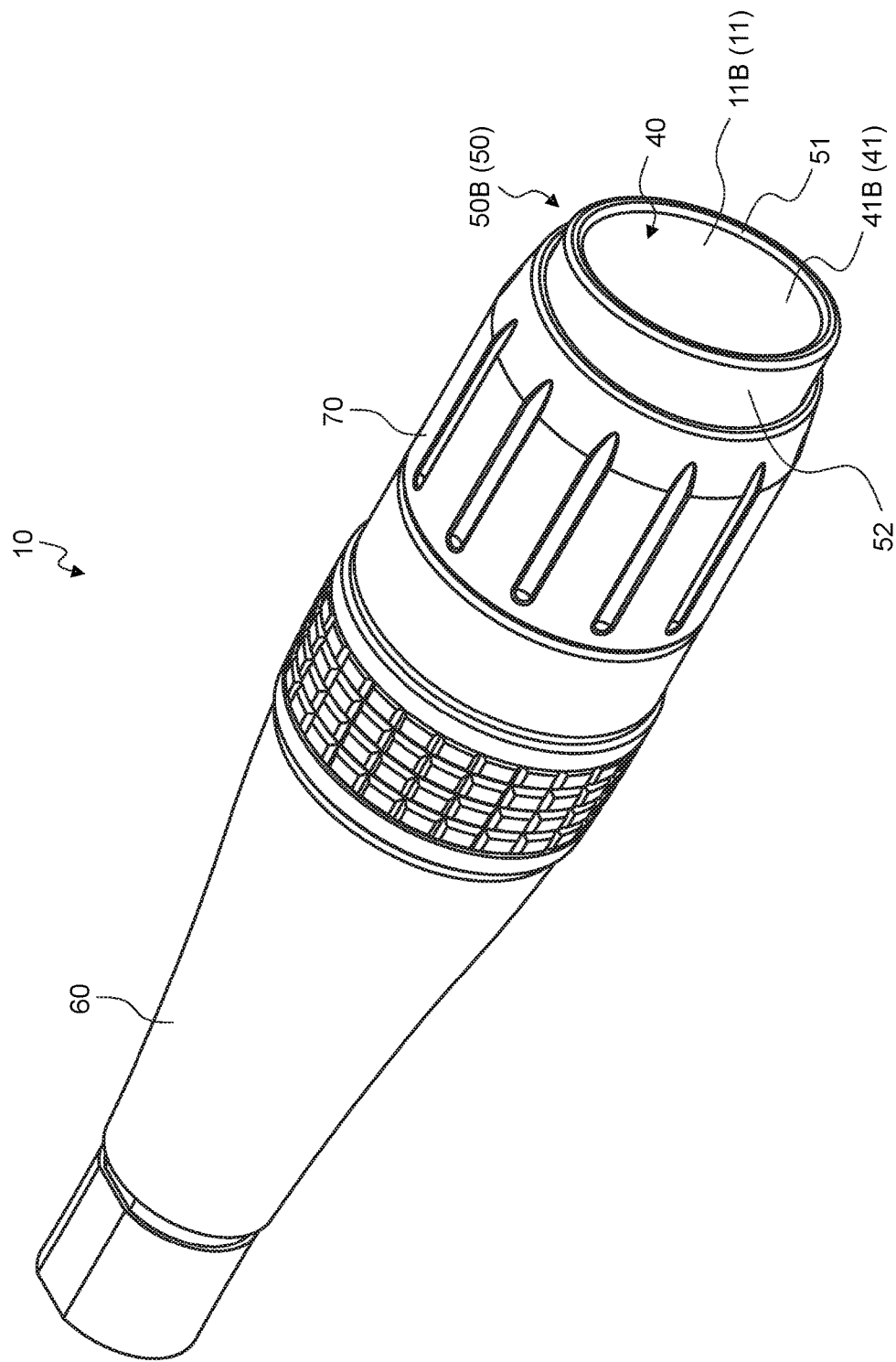
FIG. 9 is a perspective view illustrating a vehicle-mounted equipment operating device according to a first modification.
Figure 10:
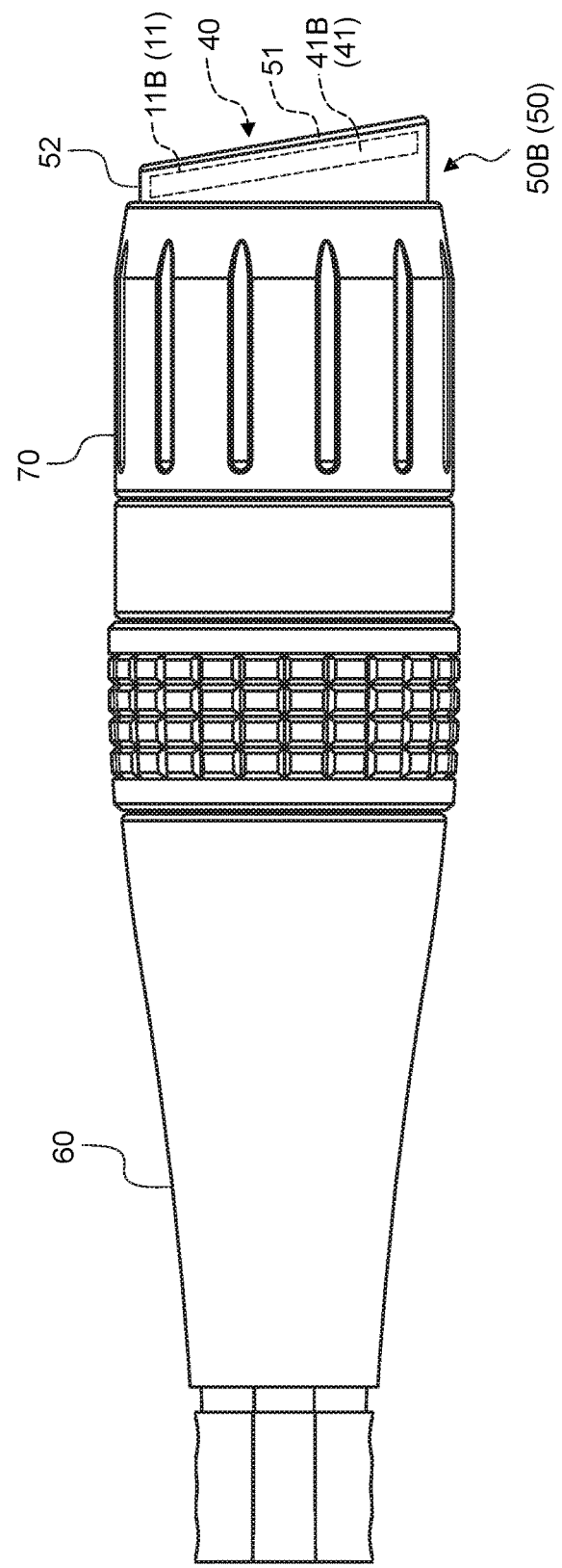
FIG. 10 is a view illustrating the vehicle-mounted equipment operating device according to the first modification as viewed from an upper side of a vehicle.

This modification is configured to replace the contact operating surface 11A with a contact operating surface 11B to be described below in the vehicle-mounted equipment operating device 10 of the vehicle-mounted equipment operation support system 1 according to the above-described embodiment (FIGS. 9 and 10). The contact operating surface 11B is used for improvement of operability in a slide operation in the vehicle front-rear direction.

The contact operating surface 11A according to the above-described embodiment is a surface perpendicular to the cylinder axis direction of the housing member 50A. On the other hand, the contact operating surface 11B according to the present modification is an operating surface that is inclined in the vehicle front-rear direction with respect to the contact operating surface 11A. In this illustrated example, the contact operating surface 11B is formed as an inclined surface approaching the steering column 202 as being directed to the vehicle front side. In order to form such arrangement of the contact operating surface 11B, a contact operating member 41B having the contact operating surface 11B and a housing member 50B that houses and holds the contact operating member 41B are provided in the present modification.

The housing member 50B is molded to have the opening 51 with an inclination equivalent to the inclination of the contact operating surface 11B. For example, the housing member 50B illustrated in this example forms an end portion of the peripheral wall portion 52 on the opening 51 side so as to provide the above-described opening 51 in the housing member 50A of the embodiment. Thus, the opening 51 is configured to intersect, instead of being perpendicular to, the cylinder axis direction in the housing member 50B illustrated in this example. The contact operating member 41B is molded to have a disk shape so as to be arranged in the opening 51, and one of two circular flat surfaces is used as the contact operating surface 11B. That is, the contact operating member 41B has the two circular flat surfaces intersecting with the cylinder axis direction of the housing member 50B, and one thereof is used as the contact operating surface 11B.

In this manner, the contact operating surface 11B according to the present modification corresponds to the surface tilted such that the vehicle front side thereof is closer to the steering column 202 more than the vehicle rear side thereof in the contact operating surface 11A according to the embodiment. Thus, the vehicle-mounted equipment operating device 10 enables the finger to smoothly move without causing any uncomfortable feeling when the operator performs the slide operation in the vehicle front-rear direction by the contact operating surface 11B inclined in the above-described manner in the vehicle-mounted equipment operation support system 1 according to the present modification. Accordingly, it is possible to further improve the operability at the time of performing the slide operation in the vehicle-mounted equipment operation support system 1 according to the present modification.

Here, the surface-textured portion (not illustrated), which has been described in the contact operating surface 11A according to the embodiment, may be provided on the entire surface or a part of the contact operating surface 11B. Accordingly, the vehicle-mounted equipment operation support system 1 according to the present modification can further improve the operability at the time of performing the slide operation and suppress the occurrence of erroneous detection of the contact operation mode.

Second Modification

Figure 11:
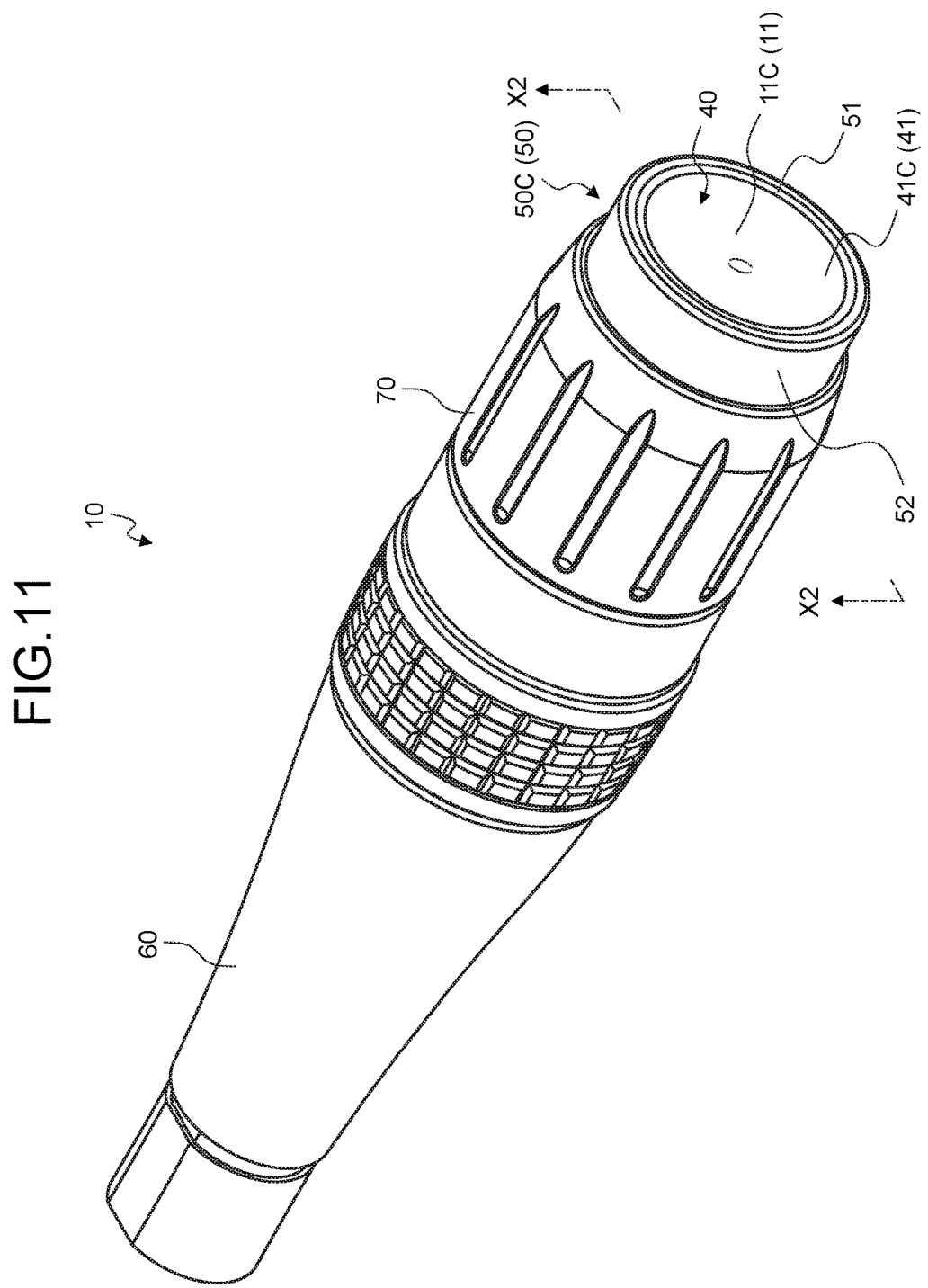
FIG. 11 is a perspective view illustrating a vehicle-mounted equipment operating device according to a second modification.
Figure 12:
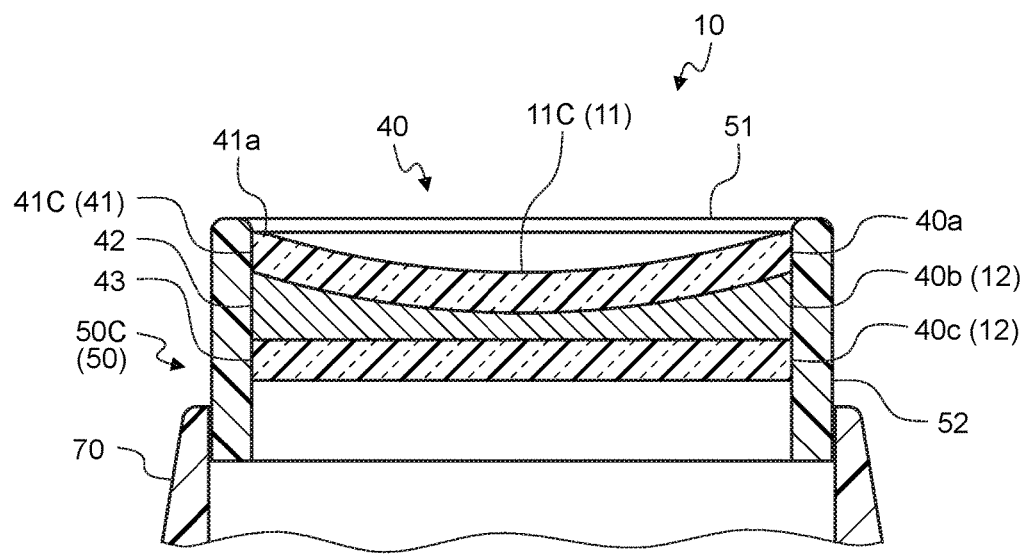
FIG. 12 is a cross-sectional view taken along line X2-X2 of FIG. 11.

This modification is configured to replace the contact operating surface 11A with a contact operating surface 11C to be described below in the vehicle-mounted equipment operating device 10 of the vehicle-mounted equipment operation support system 1 according to the above-described embodiment (FIGS. 11 and 12). The contact operating surface 11C is used for suppressing occurrence of erroneous detection of the contact operation mode accompanying an erroneous operation.

The contact operating surface 11A according to the above-described embodiment is the surface perpendicular to the cylinder axis direction of the housing member 50A, and further, is arranged at distal end of the vehicle-mounted equipment operating device 10. Thus, there is a possibility that the operator holding the steering wheel 201 may unintentionally touches the contact operating surface 11A with the finger. In regard to this, the contact operating surface 11C according to the present modification has a shape as if the planar contact operating surface 11A is recessed so that it is possible to suppress the occurrence of unintentional contact by the operator. In order to provide the contact operating surface 11C, a contact operating member 41C having the contact operating surface 11C and a housing member 50C that houses and holds the contact operating member 41C are provided in the present modification.

For example, the contact operating member 41C is molded such that one flat surface of a circular plate is recessed like a concave lens, and this recessed concave surface is used as the contact operating surface 11C. The housing member 50C is molded to have a cylindrical shape similarly to the housing member 50A. The contact operating member 41C is arranged in a state in which the contact operating surface 11C is exposed in the circular opening 51 of the housing member 50C.

In the operation input detector 40 according to the present modification, the contact operating surface 11C is recessed to the inner side of the housing member 50C with respect to the end portion on the opening 51 side of the peripheral wall portion 52 of the housing member 50C. Thus, the contact operating surface 11C is recessed to the inner side of the housing member 50C such that the operator can perform the contact operation while touching the end portion of the peripheral wall portion 52 with the finger. In the operation input detector 40, the recessed amount of the contact operating surface 11C is determined and the arrangement of the contact operating surface 11C with respect to the housing member 50C is determined such that the operator can touch the deepest portion of the contact operating surface 11C (the most recessed portion of the contact operating surface 11C) with the finger using the end portion of the peripheral wall portion 52 as a base point when performing the contact operation. Accordingly, the vehicle-mounted equipment operating device 10 according to the present modification can allow the operator to perform the contact operation on the contact operating surface 11C and suppress unintentional touch of the operator on the contact operating surface 11C. Therefore, the vehicle-mounted equipment operating device 10 can improve operability at the time of performing the contact operation on the contact operating surface 11C and suppress occurrence of the erroneous operation on the contact operating surface 11C. Accordingly, the vehicle-mounted equipment operating device 10 can suppress occurrence of erroneous detection of the contact operation mode accompanying the erroneous operation while improving the operability with respect to the contact operating surface 11C.

Here, the surface-textured portion (not illustrated), which has been described in the contact operating surface 11A according to the embodiment, may be provided on the entire surface or a part of the contact operating surface 11C. Accordingly, the vehicle-mounted equipment operation support system 1 according to the present modification can further improve the operability at the time of performing the slide operation and suppress the occurrence of erroneous detection of the contact operation mode.

Figure 13:
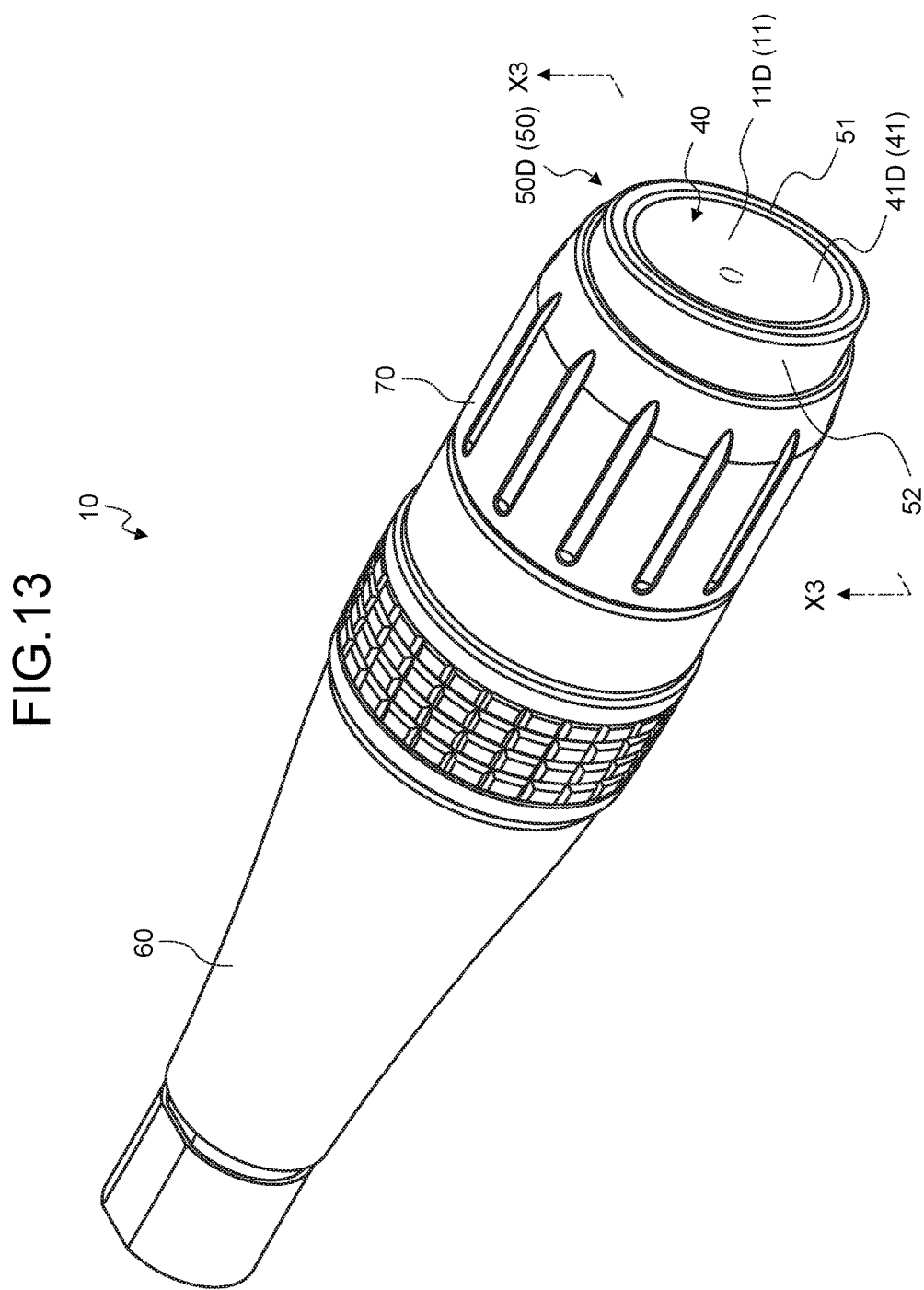
FIG. 13 is a perspective view illustrating another mode of the vehicle-mounted equipment operating device according to the second modification.
Figure 14:
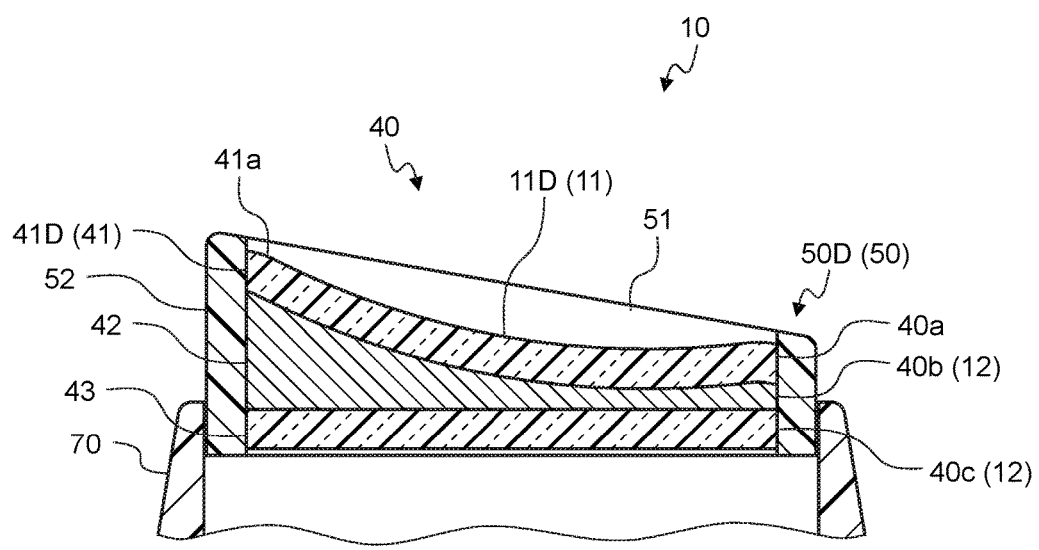
FIG. 14 is a cross-sectional view taken along line X3-X3 of FIG. 13.

In addition, the contact operating surface 11C may be replaced with a following contact operating surface 11D in the vehicle-mounted equipment operating device 10 according to the present modification (FIGS. 13 and 14). The contact operating surface 11D is configured to improve the operability of the slide operation in the vehicle front-rear direction similarly to the contact operating surface 11B according to the first modification described above. In order to provide the contact operating surface 11D, a contact operating member 41D having the contact operating surface 11D and a housing member 50D that houses and holds the contact operating member 41D are provided in the present modification.

For example, the contact operating member 41D is molded such that one flat surface of a circular plate is recessed like a concave lens, and this recessed concave surface is used as the contact operating surface 11D. Further, the contact operating member 41D is arranged in the housing member 50D to be inclined with respect to the vehicle front-rear direction such that the contact operating surface 11D is closer to the steering column 202 on an end portion on the vehicle front side more than on an end portion on the vehicle rear side. The housing member 50D illustrated in this example is molded to have the same shape as the housing member 50B according to the first modification.

In this manner, the contact operating surface 11D corresponds to the surface tilted such that the end portion on the vehicle front side is closer to the steering column 202 more than the end portion on the vehicle rear side in the above-described contact operating surface 11C having the recessed shape. Thus, the vehicle-mounted equipment operating device 10 enables the finger to smoothly move without causing any uncomfortable feeling when the operator performs the slide operation in the vehicle front-rear direction by the contact operating surface 11D having such an inclination in the vehicle-mounted equipment operation support system 1. Accordingly, it is possible to further improve the operability at the time of performing the slide operation in the vehicle-mounted equipment operation support system 1.

Here, the surface-textured portion (not illustrated), which has been described in the contact operating surface 11A according to the embodiment, may be provided on the entire surface or a part of the contact operating surface 11D even in the contact operating member 41D. Accordingly, the vehicle-mounted equipment operation support system 1 can further improve the operability at the time of performing the slide operation and suppress the occurrence of erroneous detection of the contact operation mode.

Third Modification

The description has been given assuming that the connection member (elongated member) 60 according to the above-described embodiment and the first and second modifications connects the contact operating member 41 and a vehicle body side (the steering column 202). In this modification, the connection member 60 is used as a casing of a lever switch in a lever operation unit. The lever operation unit is used to operate the vehicle-mounted equipment 100. The lever operation unit is typified by, for example, a winker lever or the like. That is, a vehicle-mounted equipment operation support system 2 according to the present modification is obtained by providing the above-described lever operation unit in the vehicle-mounted equipment operation support system 1 according to the embodiment or the first or second modification.

Figure 15:
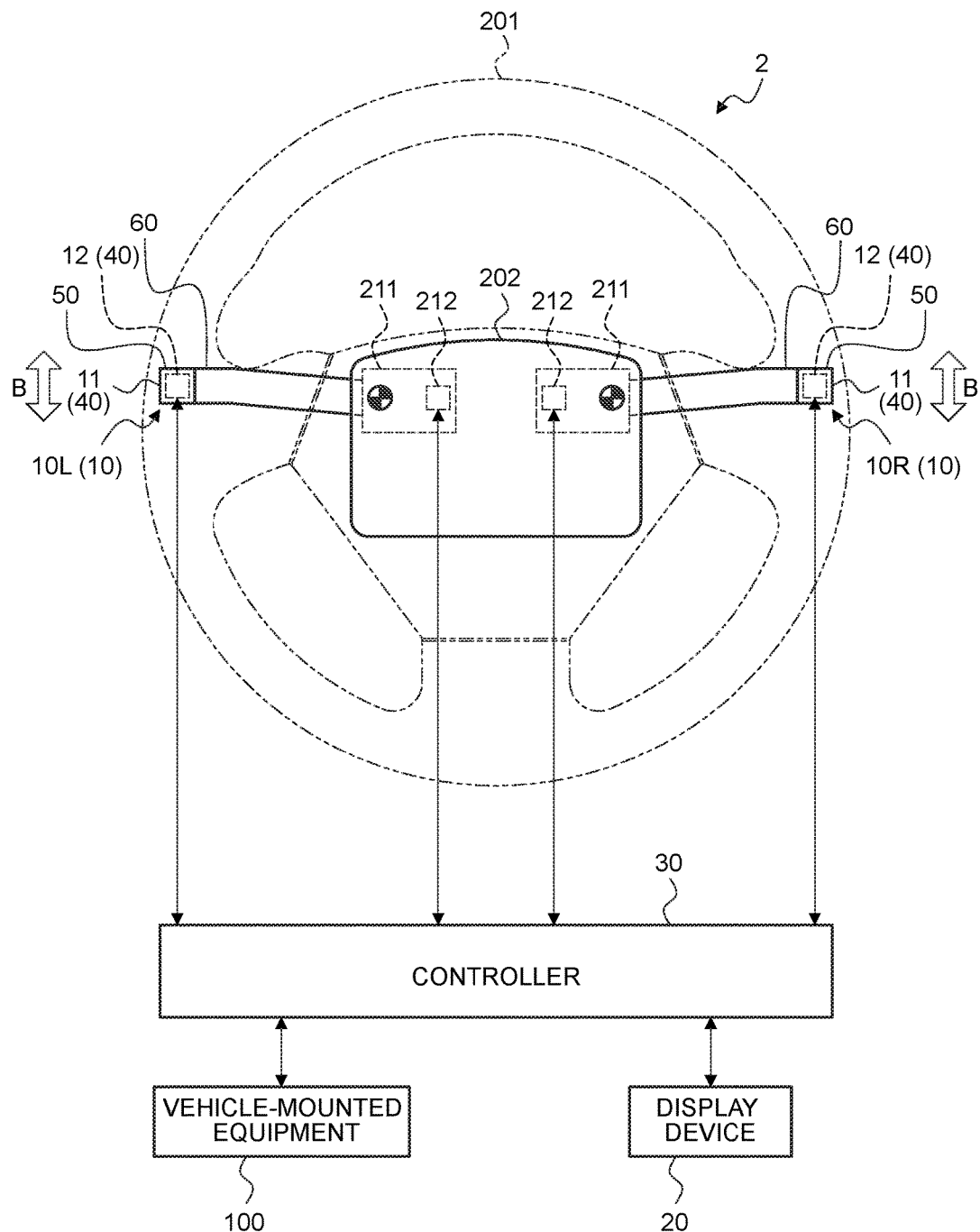
FIG. 15 is a front view illustrating a vehicle-mounted equipment operation support system according to a third modification.

The connection member 60 according to the present modification is supported by a support portion 211, which is fixed inside the steering column 202, to be freely tilted (FIG. 15). The support portion 211 is configured so as to be freely tilted using an end portion of the connection member 60 on the steering column 202 side as a fulcrum. The connection member 60 illustrated in this example can perform a tilting motion toward the vehicle front side, a tilting motion toward the vehicle rear side, a clockwise tilting motion toward one circumferential direction, and a counterclockwise tilting motion toward the other circumferential direction using a neutral position as a base point. At least one of the vehicle-mounted equipment 100 and at least one function of the vehicle-mounted equipment 100 are assigned in each operation direction of the connection member 60.

Here, the support portion 211 may be configured such that the connection member 60 returns to the neutral position by a spring force or the like after being tilted in a certain operation direction from the neutral position or may be configured such that the connection member 60 is operated to return to the neutral position by the hand of the operator after the connection member 60 is tilted from the neutral position in a certain operation direction. In the latter case, the support portion 211 is configured such that at least one step of tilting motion of the connection member 60 can be performed.

The lever operation unit is provided with a lever operation detector 212 that detects a tilt direction in the tilting motion of the connection member 60. The lever operation detector 212 transmits an output signal according to the tilting direction of the connection member 60 to the controller 30. The controller 30 can detect an operation direction of the connection member 60 performed by the operator based on the output signal. The controller 30 executes control of the vehicle-mounted equipment 100 according to the operation direction.

Although the vehicle-mounted equipment operation support system 2 according to the present modification is configured in this manner, it is possible to obtain the same effects as those described in the embodiment and the first and second modifications.

A vehicle-mounted equipment operation support system according to the present embodiment is capable of assigning a plurality of contact operation modes in various forms to a single contact operating surface and is configured to be highly convenient since it is possible to operate a large number of the vehicle-mounted equipment or a large number of functions of the vehicle-mounted equipment on the contact operating surface. Further, the vehicle-mounted equipment operation support system displays operation-related information associated with the contact operation mode on a display device to be visually recognizable and shifts the display content of the operation-related information according to the contact operation mode, and thus, is configured to give the favorable operability to an operator.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle-mounted equipment operation support system comprising:
   a vehicle-mounted equipment operating device, the vehicle-mounted equipment operating device including a contact operating surface configured to receive a contact operation inputted by an operator by a finger of the operator, wherein a plurality of contact operation modes are assigned to the contact operating surface, the vehicle-mounted equipment operating device also including an operation mode detector configured to detect a contact operation mode of the contact operating surface selected by the operator through the contact operating surface;
   a display device which displays operation-related information relating to the contact operation and the contact operation mode; and
   a controller configured to control an operation of vehicle-mounted equipment so as to operate or stop an operation of the vehicle-mounted equipment in accordance with an output signal outputted by the contact operating surface corresponding to the contact operation, and an output signal outputted by the contact operation mode detector corresponding to the contact operation mode, and perform display control of the display device so as to display the operation-related information on the display device based on the output signals outputted by the contact operating surface and the operation mode detector, the display control including at least shifting display content of the operation-related information according to the outputted signals outputted by the contact operating surface and the contact operation mode detector,
   wherein the contact operating surface is arranged at a position that is closer to a vehicle front side than a vehicle steering wheel and enables the operator to perform a contact operation without taking off a hand from the steering wheel,
   wherein the contact operating surface includes a touch sensor and is configured to receive the contact operation via a slide operation of tracing the contact operating surface with a fingertip executed by the operator,
   wherein the slide operation includes the operator sliding the finger across a surface of the touch sensor,
   wherein the slide operation includes a slide operation direction, and
   wherein at least one of the output signal outputted by the contact operating surface and the output signal outputted by the contact operation mode detector corresponds to the slide operation direction such that the controller is configured to control the operation of the vehicle-mounted equipment and perform display control of the display device in coordination with the slide operation direction.

2. The vehicle-mounted equipment operation support system according to claim 1, wherein
   the controller is configured to cause the display device to display as the operation-related information at least one of:
   (a) operation assistance information indicating an assignment of a contact operation mode with respect to the contact operating surface in association with an operation command for the vehicle-mounted equipment;
   (b) operation information indicating a contact operation mode when the operator operates the contact operating surface;
   (c) operation result information indicating an operation result when the operator operates the contact operating surface; and
   (d) equipment information indicating a state of the vehicle-mounted equipment.

3. The vehicle-mounted equipment operation support system according to claim 1, wherein
the display device is a head-up display device.

4. The vehicle-mounted equipment operation support system according to claim 2, wherein
the display device is a head-up display device.

5. The vehicle-mounted equipment operation support system according to claim 1, wherein the contact operating surface is formed to have a size such that the contact operating surface can be covered with a fingertip of the operator's finger.

6. The vehicle-mounted equipment operation support system according to claim 1, wherein the touch sensor of the contact operating surface includes a pattern electrode in which a transmitting electrode and a receiving electrode are alternately arranged in a lattice pattern.

7. The vehicle-mounted equipment operation support system according to claim 1, wherein the controller is configured to control the operation of the vehicle-mounted equipment in accordance with the output signal outputted by the contact operating surface corresponding to the contact operation when the contact operation is performed by the execution of the slide operation, wherein the slide operation includes a deviation within a predetermined range with respect to a reference contact operation position, at a contact operation position on the contact operating surface.

8. The vehicle-mounted equipment operation support system according to claim 1, wherein the controller is configured to perform the display control of the display device such that the displayed operation-related information is displayed as a virtual operation unit figure, the virtual operation unit figure corresponding to the shape of the contact operating surface.

9. The vehicle-mounted equipment operation support system according to claim 1, wherein the contact operating surface is provided as a surface which is perpendicular to a cylinder axis direction of a housing member.

10. The vehicle-mounted equipment operation support system according to claim 1, the contact operating surface is provided as a surface which is inclined in a vehicle front-rear direction with respect to a cylinder axis direction of a housing member.

11. The vehicle-mounted equipment operation support system according to claim 1, the contact operating surface is provided so as to be concave with respect to a slide operation direction.

12. The vehicle-mounted equipment operation support system according to claim 1, the contact operating surface is provided with a surface-textured portion.

13. The vehicle-mounted equipment operation support system according to claim 8, wherein the controller is configured to shift the virtual operation unit figure in a direction corresponding to the slide operation direction.

* * * * *